(12) United States Patent
Hain et al.

(10) Patent No.: US 7,717,741 B2
(45) Date of Patent: May 18, 2010

(54) JUNCTION BOLT, JUNCTION ELEMENT, AND ELECTRICALLY CONDUCTIVE COUPLING DEVICE

(75) Inventors: Jochen Hain, Eschenburg-Wissenbach (DE); Mahzuni Yagci, Wettenberg (DE); Ralf Pimper, Homberg/Ohm (DE); Joachim Geist, Mücke (DE); Joachim Schneider, Ehringshausen-Katzenfurt (DE)

(73) Assignee: Newfrey LLC, Newark, DE (US)

( * ) Notice: Subject to any disclaimer, the term of this patent is extended or adjusted under 35 U.S.C. 154(b) by 44 days.

(21) Appl. No.: 12/108,943

(22) Filed: Apr. 24, 2008

(65) Prior Publication Data
US 2008/0214047 A1 Sep. 4, 2008

Related U.S. Application Data

(63) Continuation of application No. PCT/EP2006/067902, filed on Oct. 27, 2006.

(51) Int. Cl.
*H01R 13/52* (2006.01)
(52) U.S. Cl. ........................................ 439/522; 439/140
(58) Field of Classification Search ................ 439/522, 439/141, 140, 588
See application file for complete search history.

(56) References Cited

U.S. PATENT DOCUMENTS

| | | | | | |
|---|---|---|---|---|---|
| 3,449,706 | A | * | 6/1969 | Carissimi | 439/141 |
| 3,683,315 | A | * | 8/1972 | Kelly | 439/141 |
| 5,013,259 | A | * | 5/1991 | Maurer | 439/522 |
| 5,496,197 | A | * | 3/1996 | Grivet | 439/726 |
| 5,931,690 | A | * | 8/1999 | Sai et al. | 439/350 |
| 6,079,923 | A | * | 6/2000 | Ross et al. | 411/353 |
| 6,135,691 | A | * | 10/2000 | Nadarajah et al. | 411/431 |
| 6,153,329 | A | * | 11/2000 | Raschilla et al. | 429/65 |
| 6,723,920 | B2 | * | 4/2004 | Higuchi et al. | 174/50 |

FOREIGN PATENT DOCUMENTS

| | | |
|---|---|---|
| DE | 3613397 | 11/1989 |
| DE | 9413406 | 11/1994 |

\* cited by examiner

*Primary Examiner*—Hien Vu
(74) *Attorney, Agent, or Firm*—Stephen R. Valancius; Michael P. Leary

(57) ABSTRACT

Junction bolt having a shank and a foot arranged at one end of the shank and intended for attachment of the junction bolt to a part, the shank includes an outer surface forming a surface of contact for attachment of a junction element. The outer surface of the shank is surrounded by a protective sleeve covering the surface of contact on the shank and movable into a position in which the surface of contact is freely accessible.

14 Claims, 1 Drawing Sheet

JUNCTION BOLT, JUNCTION ELEMENT, AND ELECTRICALLY CONDUCTIVE COUPLING DEVICE

CROSS REFERENCE TO RELATED APPLICATIONS

This application is a continuation of pending PCT Application No. PCT/EP2006/067902, filed Oct. 27, 2006 which claims priority from German Patent Application No. 10 2005 052 309.9, filed Nov. 1, 2005, the disclosures of which are incorporated herein by reference.

BACKGROUND OF THE INVENTION

The invention relates to a junction bolt, in particular a weld bolt, having a shank and a foot arranged at one end of the shank and intended for attachment of the bolt to a structural part. The invention relates further to a junction element and to a junction bolt and a junction element including an electrically conductive coupling device.

In motor vehicles, so-called ground junctions are required in numerous locations, connecting electrical equipment arranged in the vehicle with the vehicle frame. The ground junctions generally have a junction bolt electrically conductively connected to the bodywork of the vehicle by welding or some other method. Junction bolts of the kind specified are disclosed by DE 3,613,397 C2 and DE 9,413,406 U1. The known junction bolts have a shank provided with a thread and a shoulder formed by a foot and facing the shank, forming a contact surface. In order to bring it about that for instance in any painting operation in which the part provided with the junction bolt, for example the vehicle bodywork, is coated with a layer of paint, but the paint must not reach the threaded portion of the weld bolt and the surface of contact, the known junction bolts are provided before assembly with a protective cap or cap nut surrounding the shank and in close contact with the shoulder. Prior to the ensuing assembly of a contact element, the protective cap or cap nut must first be removed, which is troublesome and requires additional assembly outlay. If the cap nut is then used to connect the contact elements, the placement and tightening of the cap nut are also time-consuming.

SUMMARY OF THE INVENTION

An object of the invention is to create a junction bolt of the kind initially specified, and a junction element cooperating therewith as well as a coupling means derived therefrom, rendering possible simple and rapid assembly.

According to an aspect of the invention, provision is made for the junction bolt to comprise a shank and an outer surface forming a surface of contact for attachment of a junction element, the outer surface of the shank being surrounded by a protective sleeve covering the surface of contact and movable on the shank into a position in which the surface of contact is freely accessible.

The conformation of the junction bolt according to an aspect of the invention has the advantage that the removal of a protective cap or cap nut may be dispensed with. Instead, the protective shaft at assembly of a junction element can be moved relative to the shank in such manner that the contact surfaces of the contact element can be brought into contact. The arrangement of the contact surfaces on the shank may have the further advantage that the junction element can be mounted by placement on the shank and that time-consuming screwing operations are eliminated. Here, the shank of the junction bolt may have a smooth outer surface, but it may alternatively be threaded, so that the same bolt will be suitable also for other fastening purposes.

The protective sleeve may be variable in length according to the invention; and may take the form of a bellows. Here it suffices to expose the surfaces of contact if the protective sleeve is compressed in axial direction, where it is advantageous that the remaining short axial length of the protective sleeve occupy but little space on the shank of the junction bolt. Accordingly, the junction bolt may be made correspondingly short.

In order for the surfaces of contact covered by the protective sleeve to be effectively protected from entry of paint and lacquer, according to another aspect of the invention sealing lips are provided in contact with the shank at the ends of the protective sleeve.

At the foot of the junction bolt, according to another aspect of the invention a flange may be configured of greater diameter than the foot and arranged at an axial distance from the fastening end of the foot. By means of this flange, a junction element arranged on the junction bolt can be fixed in axial direction. If the junction bolt is a welding bolt, the flange may serve additionally to introduce the welding current.

The junction element to solve the stated problem comprises, according to the invention, a radial spring yielding box having an opening to accommodate the shank of a junction bolt, surfaces of contact being provided in the opening. On the insertion side, the box may have a collar extending radially outward, to be adjoined by another box segment of larger diameter, intended to overlap the flange of a junction bolt. The junction element may also comprise a contact flag extending radially from the box, embracing the outside in the manner of a strap.

The invention may also comprise an electrically conductive coupling means consisting of a junction bolt and a junction element according to the invention.

BRIEF DESCRIPTION OF THE DRAWINGS

The invention will now be illustrated in more detail with reference to an embodiment shown in the drawing by way of example. In the drawing.

DETAILED DESCRIPTION OF EXEMPLARY EMBODIMENTS OF THE INVENTION

The present invention will now be described more fully with reference to the accompanying drawings, in which exemplary embodiments of the invention are shown.

Figure 1:
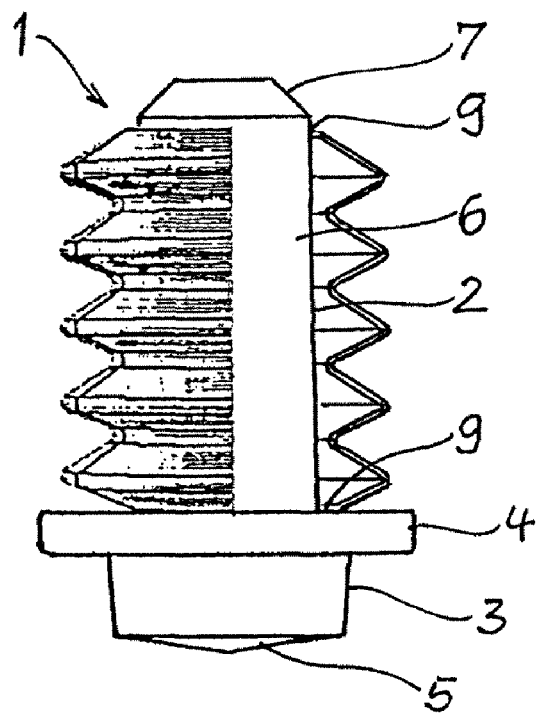
FIG. 1 shows a junction bolt with protective sleeve according to an exemplary embodiment of the invention.

FIG. 1 shows a junction bolt 1 intended for use as a ground bolt in motor vehicles, and so configured that it can be connected to the vehicle bodywork by lift ignition welding. The junction bolt 1 has a shank 2 and a foot 3. The foot 3 has a larger diameter than the shank 2, and comprises at its end towards the shank 2 a flange 4 with circular outer contour. The end of the foot 3 away from the shank 2 is provided with an obtuse conical surface 5, whose vertex serves to produce a central are when the junction bolt 1 is welded on. In welding, the junction bolt 1 may be held to the flange 4 by means of a tongs transmitting the welding current to the junction bolt 1. The shank 2 has a smooth cylindrical outer surface 6 forming a surface of contact for attachment of a junction element. Instead of the smooth surface the outer surface 6 may alternatively be threaded if an additional possible fastening by means of a nut is to be provided. The free end of the shank 2 is provided with a bevel 7 in the shape of a truncated cone, to facilitate assembly of the junction element.

The outer surface 6 of the shank 2 is surrounded over nearly its entire length by a protective sleeve 8. The protective sleeve 8 consists of plastic and takes the form of a bellows made up of a plurality of truncated cone wall segments. At its open end, the protective sleeve 8 comprises sealing lips 9, sealing the protective sleeve 8 off from the outer surface 6.

The protective sleeve 8 has the function of keeping the outer surface 6 of the junction bolt 1, serving as contact surface, free from paint and lacquer when the bodywork part with junction bolt 1 welded to it is coated with paint or lacquer. In the subsequent assembly of a junction element, the protective sleeve 8, owing to its configuration, can be compressed in axial direction to a fraction of its original length so that a protected portion of the outer surface 6 is exposed for connection of a junction element.

Figure 2:
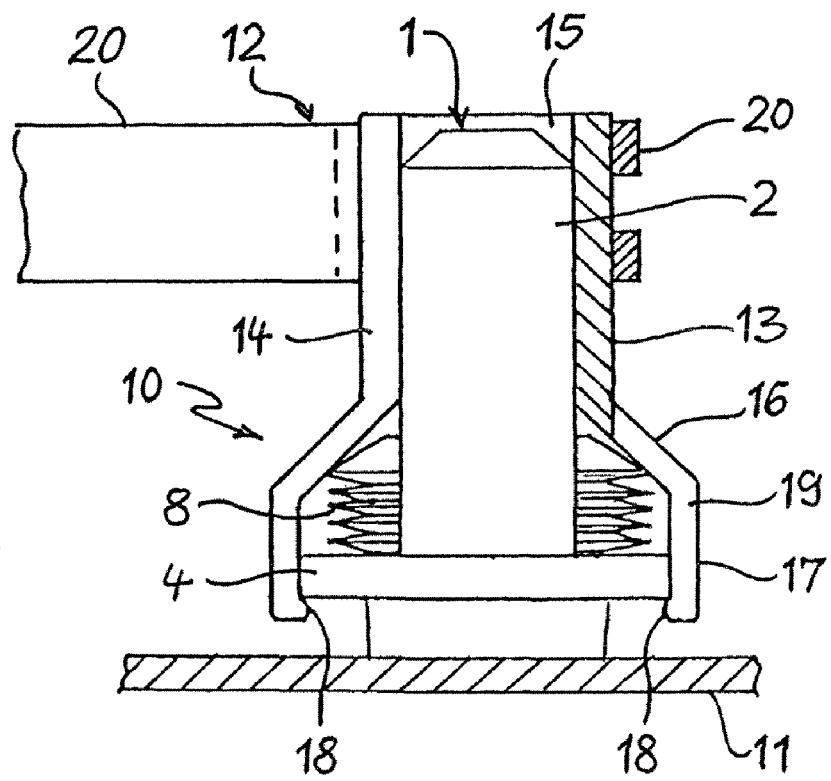
FIG. 2 shows a coupling device containing the junction bolt according to FIG. 1.

FIG. 2 shows an electrically conductive coupling device 10 to form a ground connection in a motor vehicle. The coupling device 10 consists of the junction bolt 1 electrically conductively connected to a bodywork part 11 by welding with protective sleeve 8 and a junction element 12 detachably connected to the junction bolt 1. The junction bolt 1 is so welded to the bodywork part 11 that the flange 4 is located at a distance from the bodywork part 11.

The junction element 12 consists of a box 13 provided with a slit 14 extending in lengthwise direction with radial spring action. The box 13 has a cylindrical opening 15 the inside wall of which forms a surface of contact. In relaxed condition of the box 13, the inside diameter of the opening 15 is slightly smaller than the outside diameter of the shank 2 of the junction bolt 1. By placement on the shank 2, the box 13 is enlarged with spring action to the shank diameter, so that it rests on the shank 2 with a spring action counteracting the enlargement. On the insertion side of the opening 15, the box 13 comprises a truncated conical collar 16 extending radially outward, guiding the end of the junction bolt 1 towards the opening 15 in the manner of a funnel, when the parts of the coupling device 10 are connected to each other. The outer edge of the collar 16 is adjoined by a cylindrical box segment 17, whose inside diameter is matched to the outside diameter of the flange 4. At its free end, the box segment 17 comprises catch elements 18 directed radially inward, which upon attachment of the junction element 12 slip over the flange 4 and catch it on the side towards the bodywork part 11, thereby securing the junction element 12 on the junction bolt 1. The surmounting of the flange 4 by the catch elements 18 is facilitated by an additional slit 19 in the collar 16 and the box segment 17. A plurality of slits 19 may alternatively be provided.

For connection of a cable, the junction element 12 comprises a contact flag 20 consisting of a strip of sheet metal embracing the box 13 on the outside in the manner of a strap. The contact flag 20 may be held on the box 13 with radial pre-stress, by friction or geometrically; alternatively, it may be permanently connected to the box 13 by spot welding.

As shown in FIG. 2, when placing the junction element 12 on the shank 2 of the junction bolt 1, the protective sleeve 8 is shifted by the collar 16 towards the flange 4, and thus compressed. In the final position of the junction element 12, the collar 16 and the box segment 17 form a cavity in which there is room for the compressed protective sleeve 8. Removal of the protective sleeve 8 prior to assembly of the junction element 12 can therefore be dispensed with.

While the present invention has been particularly shown and described with reference to exemplary embodiments thereof, it will be understood by those of ordinary skill in the art that various changes in form and details may be made therein without departing from the spirit and scope of the exemplary embodiments of the present invention as defined by the following claims.

What is claimed is:

1. A junction bolt comprising:
    a shank;
    a foot arranged at one end of the shank and configured for attachment of the junction bolt to a body work part;
    wherein said shank comprises an outer surface forming a surface of contact for attachment of a junction element, and the outer surface of the shank is surrounded by a protective sleeve, covering the surface of contact and movable along the shank into a position in which the surface of contact is freely accessible;
    said junction element comprising a radially spring yielding box with an opening to accommodate the shank of the junction bolt, contact surfaces being provided in the opening;
    wherein said protective sleeve positions between said shank and said radially spring yielding box; and
    wherein said radially yielding box includes a first portion, a collar and a box segment.

2. The junction bolt according to claim 1, wherein the outer surface is cylindrical and smooth.

3. The junction bolt according to claim 1, wherein the protective sleeve is variable in length.

4. The junction bolt according to claim 1, wherein the protective sleeve has the form of a bellows.

5. The junction bolt according to claim 1, wherein sealing lips in contact with the shank are provided at the ends of the protective sleeve.

6. The junction bolt according to claim 1, wherein a flange is configured at the foot, having a larger diameter than the foot and arranged at an axial distance from the fastening end of the foot.

7. The junction element according to claim 1, wherein the collar extends at least radially from the first portion, and the box segment extends from the collar portion to overlap the flange of the junction bolt.

8. The junction element according to claim 1, wherein a contact flag extends radially from the box and embraces the box on the outside in the manner of a strap.

9. The junction element according to claim 7, wherein the box segment comprises catch elements directed radially inward at a free end near the flange of the junction bolt.

10. An electrically conductive coupling device consisting of a junction bolt and a junction element according to claim 1.

11. The junction bolt according to claim 1, wherein the junction bolt is a welding bolt.

12. The junction bolt according to claim 1, wherein the protective sleeve is compressible towards the foot.

13. The junction bolt according to claim 12, further comprising a flange between the foot and the shank, wherein the protective sleeve is compressible against the flange.

14. The junction element according to claim 1, wherein the box segment has a diameter greater than a diameter of the first portion.

* * * * *